United States Patent
Cooper et al.

(10) Patent No.: US 7,241,324 B2
(45) Date of Patent: Jul. 10, 2007

(54) METHOD OF PRODUCING ABRASIVE TOOLS

(75) Inventors: Alex Cooper, Brooklyn, NY (US); Sergey Vladimirtsev, Brooklyn, NY (US); Yevgeny Bederak, New York, NY (US)

(73) Assignee: Universal Photonics LLC, Hicksville, NY (US)

( * ) Notice: Subject to any disclaimer, the term of this patent is extended or adjusted under 35 U.S.C. 154(b) by 0 days.

(21) Appl. No.: 11/369,121

(22) Filed: Mar. 6, 2006

(65) Prior Publication Data

US 2006/0150525 A1    Jul. 13, 2006

Related U.S. Application Data

(63) Continuation-in-part of application No. 10/822,878, filed on Apr. 13, 2004, now abandoned.

(51) Int. Cl.
*B24D 3/00* (2006.01)
*B24D 11/00* (2006.01)
*B24D 17/00* (2006.01)
*B24D 18/00* (2006.01)
*C09K 3/14* (2006.01)

(52) U.S. Cl. .............................. 51/263; 51/298; 51/299

(58) Field of Classification Search ........... 51/293–309
See application file for complete search history.

(56) References Cited

U.S. PATENT DOCUMENTS

| 2,278,442 | A | * | 4/1942 | Heany | 501/119 |
| 5,076,815 | A | * | 12/1991 | Kunz et al. | 51/293 |
| 5,236,471 | A | * | 8/1993 | Van Dijen | 51/293 |
| 5,259,147 | A | * | 11/1993 | Falz et al. | 51/293 |
| 5,531,799 | A | * | 7/1996 | Wagner et al. | 51/309 |
| 2004/0187393 | A1 | * | 9/2004 | Mutoh et al. | 51/309 |

* cited by examiner

*Primary Examiner*—J. A. Lorengo
*Assistant Examiner*—Pegah Parvini
(74) *Attorney, Agent, or Firm*—I. Zborovsky

(57) ABSTRACT

A method of producing abrasive tools with abrasive particles consisting of $Al_2O_3$ has the steps of producing a mixture of initial components with particles of $Al(OH)_3$, forming blanks of an abrasive tool from the mixture of the initial components with the particles of $Al(OH)_3$, subsequently producing the abrasive tools with the abrasive particles of $Al_2O_3$ by subjecting the blanks to a heat treatment such that the particles of $Al(OH)_3$ are converted into the abrasive particles of $Al_2O_3$ in the tools, wherein the forming includes rolling a sheet from the mixture of the initial components with the particles of $Al(OH)_3$ before the heat treatment and conversion of the particles of $Al(OH)_3$ the abrasive particles of $Al_2O_3$ which particles of $Al(OH)_3$ are softer than the abrasive particles of $Al_2O_3$ and therefore do not damage a rolling equipment, and thereafter separating the blanks of the abrasive tools from the sheet for the subjecting to the heat treatment.

1 Claim, 1 Drawing Sheet

METHOD OF PRODUCING ABRASIVE TOOLS

CROSS-REFERENCE TO A RELATED APPLICATION

This application is a continuation-in-part of patent application Ser. No. 10/822,878 now abandoned.

BACKGROUND OF THE INVENTION

The present invention relates to a method of producing abrasive tools.

More particularly, the present invention relates to a method of producing abrasive tools.

Methods of producing abrasive tools of this type are known in the art. In accordance with a known method, an initial material including several components, and aluminum oxide abrasive powder is processed by rolling in rolls to obtain a sheet, and thereafter the corresponding tools are made from the sheet, for example by punching with subsequent thermal treatment. The disadvantage of this solution is that generally the rolls are formed of metal, and during rolling of the sheet, the hard particles of aluminum oxide cut the surfaces of the rolls and therefore significantly wear them.

SUMMARY OF THE INVENTION

It is an object of the present invention to provide a new method of producing abrasive tools which eliminates the disadvantages of the prior art.

In keeping with these objects and with others which will become apparent hereinafter, one feature of the present invention resides, briefly stated in a method of producing abrasive tools with abrasive particles consisting of $Al_2O_3$, comprising the steps of producing a mixture of initial components with particles of $Al(OH)_3$; forming blanks of an abrasive tool from the mixture of the initial components with the particles of $AL(OH)_3$; subsequently producing the abrasive tools with the abrasive particles of $Al_2O_3$ by subjecting the blanks to a heat treatment such that the particles of $Al(OH)_3$ are converted into the abrasive particles of $Al_2O_3$ in the tools, wherein said forming includes rolling a sheet from the mixture of the initial components with the particles of $Al(OH)_3$ before the heat treatment and conversion of the particles of $Al(OH)_3$ the abrasive particles of $Al_2O_3$ which particles of $Al(OH)_3$ are softer than the abrasive particles of $Al_2O_3$ and therefore do not damage a rolling equipment, and thereafter separating the blanks of the abrasive tools from the sheet for the subjecting to the heat treatmet.

When the method is performed and in accordance with the present invention, the particles which together with other components of an initial mixture are subjected to rolling in rolls are not aluminum oxide particles which are very hard, but instead they are particles of $Al(OH)_3$, so that the rolls are no longer subjected to excessive wear as in the prior art. During the subsequent thermal treatment $Al(OH)_3$ particles are converted into $Al_2O_3$ particles thus forming the final abrasive particles.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

In accordance with the present invention abrasive tools with abrasive particles composed exclusively of aluminum oxide are produced in the following manner.

First of an initial material including mixture of several components is provided. The mixture can include for example a base of butadiene nytril rubber, a curing agent of sulfur, a softener of dibutyl phtalate, polyvinyl chloride, hardener, phenolic resin, and a powder composed of particles of $Al(OH)_3$.

Figure 1:
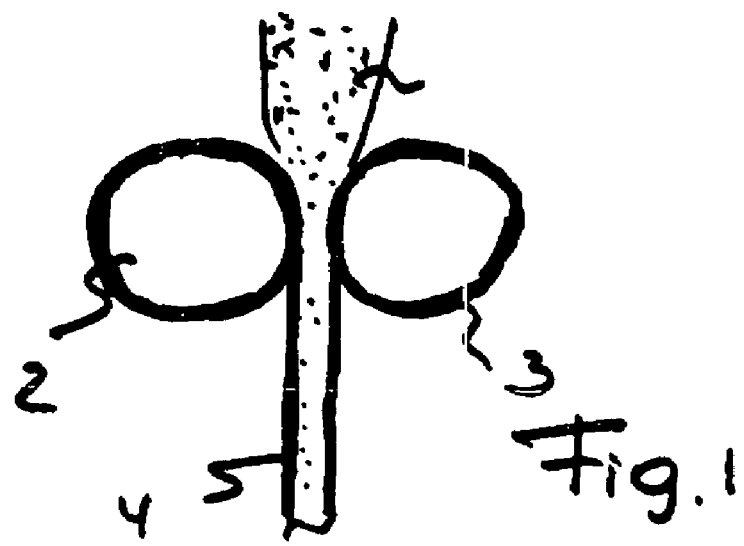
FIGS. 1-3 are views showing corresponding steps of a new method for producing abrasive tools in accordance with the present invention.

The thusly produced mixture which is identified with reference numeral 1 is rolled between rolls 2 and 3 so as to form a sheet 4 composed for example of the above-mentioned components and the particles of $Al(OH)_3$ as shown in FIG. 1.

Figure 2:
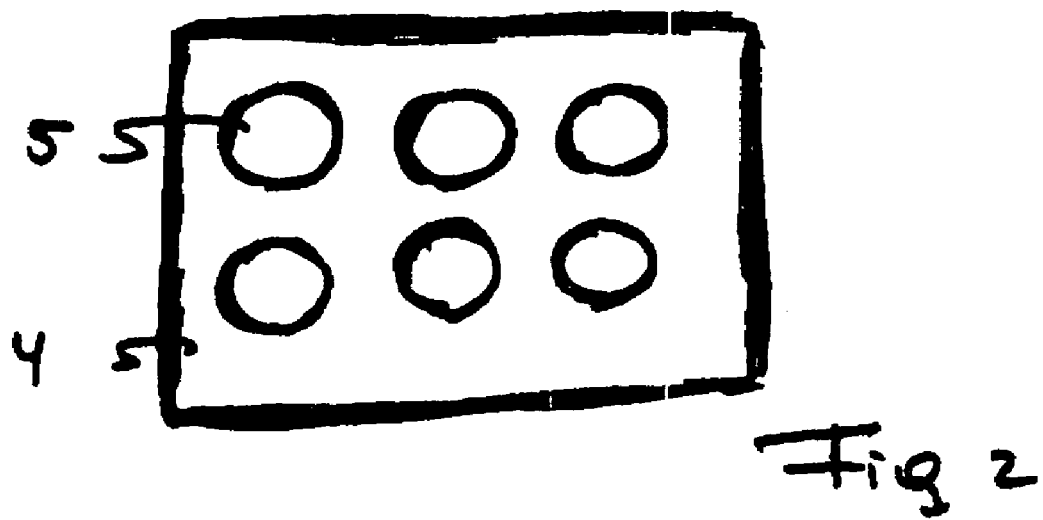

After the sheet 4 is produced, it is supplied to a next working position shown in FIG. 2, in which blanks of abrasive tools or working elements of the abrasive tools are formed, as identified with reference numeral 5. If the abrasive tool is a self-supporting disk it is formed directly as shown in FIG. 2, for example by punching of the abrasive tool from the sheet 4. If the abrasive tool is a working element to be placed on a supporting base, spindle, etc., then the working element for the abrasive tool is produced as shown in FIG. 2.

Figure 3:
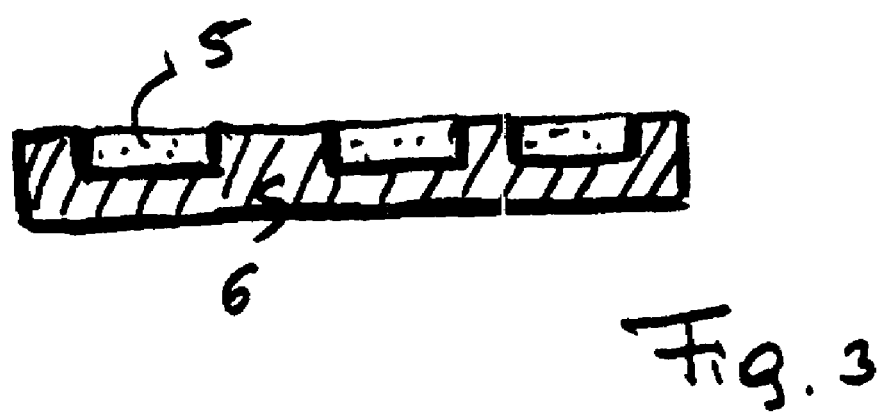

The punched out blanks of working elements or tools, which can be disc-shaped or can have a different shape, are then supplied for a thermal treatment, for example in a mold 6 as shown in FIG. 3. In the mold 6, under the action of heat for example in an oven or a press, the working elements or the working tools 5 are thermally treated. During the thermal treatment at elevated temperature for example 200-300° C., the particles of $Al(OH)_3$ are converted into the particles of $Al_2O_3$, which form the final and only abrasive particles of the abrasive tool or of the working element of the abrasive tool.

It will be understood that each of the elements described above, or two or more together, may also find a useful application in other types of constructions differing from the types described above.

While the invention has been illustrated and described as embodied in a method of producing abrasive tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing abrasive tools with abrasive particles consisting of $Al_2O_3$, comprising the steps of producing a mixture of initial components with particles of $Al(OH)_3$; forming blanks of an abrasive tool from the mixture of the initial components with the particles of $Al(OH)_3$; subsequently producing the abrasive tools with the abrasive particles of $Al_2O_3$ by subjecting the blanks to a heat treatment such that the particles of $Al(OH)_3$ are converted into the abrasive particles of $Al_2O_3$ in the tools, wherein said forming includes rolling a sheet from the mixture of the initial components with the particles of $Al(OH)_3$ before the heat treatment and conversion of the particles of $Al(OH)_3$ into the abrasive particles of $Al_2O_3$ which particles of $Al(OH)_3$ are softer than the abrasive particles of $Al_2O_3$ and therefore do not damage a rolling equipment; and thereafter separating the blanks of the abrasive tools from the sheet for the subjecting to the heat treatment; and using as the initial components a base of butadienenytril rubber, a curing agent of sulfur, a softener of dibutylphthalate, polyvinyl chloride, hardener, phenolic resin with the particles of $Al(OH)_3$.

* * * * *